United States Patent
Steede

(10) Patent No.: US 11,983,743 B2
(45) Date of Patent: May 14, 2024

(54) TRAINING AN ARTIFICIAL INTELLIGENCE ENGINE FOR GENERATING MODELS TO PROVIDE TARGETED ACTIONS

(71) Applicant: Truist Bank, Charlotte, NC (US)

(72) Inventor: Remington Steede, Fayetteville, GA (US)

(73) Assignee: TRUIST BANK, Charlotte, NC (US)

(*) Notice: Subject to any disclaimer, the term of this patent is extended or adjusted under 35 U.S.C. 154(b) by 0 days.

(21) Appl. No.: 17/662,346

(22) Filed: May 6, 2022

(65) Prior Publication Data

US 2023/0360088 A1 Nov. 9, 2023

(51) Int. Cl.
*G06Q 30/0251* (2023.01)
*G06N 3/088* (2023.01)
*H04L 41/16* (2022.01)

(52) U.S. Cl.
CPC ......... *G06Q 30/0271* (2013.01); *G06N 3/088* (2013.01); *G06Q 30/0255* (2013.01); *H04L 41/16* (2013.01)

(58) Field of Classification Search
CPC ........... G06Q 30/0271; G06Q 30/0255; G06N 3/088; H04L 41/16
See application file for complete search history.

(56) References Cited

U.S. PATENT DOCUMENTS

| | | | | |
|---|---|---|---|---|
| 10,861,031 | B2 * | 12/2020 | Sullivan | G06N 20/00 |
| 11,455,656 | B2 * | 9/2022 | Ma | G06Q 30/0251 |
| 11,544,627 | B1 * | 1/2023 | Bryce | G06Q 40/06 |
| 2008/0313010 | A1 * | 12/2008 | Jepson | G06Q 30/0243 |
| | | | | 705/7.32 |
| 2009/0265290 | A1 * | 10/2009 | Ciaramita | G06N 3/08 |
| | | | | 706/12 |
| 2010/0223641 | A1 * | 9/2010 | Hubbard | H04N 21/41407 |
| | | | | 725/35 |
| 2010/0262464 | A1 * | 10/2010 | Monteforte | G06Q 30/0268 |
| | | | | 705/14.65 |
| 2013/0024211 | A1 * | 1/2013 | Monteforte | G06Q 30/0268 |
| | | | | 705/3 |
| 2013/0325624 | A1 * | 12/2013 | Cardella | G06Q 30/02 |
| | | | | 705/14.66 |
| 2017/0053299 | A1 * | 2/2017 | Rozga | G06Q 30/0203 |
| 2018/0053208 | A1 * | 2/2018 | Upstone | G06Q 30/0245 |
| 2020/0387935 | A1 * | 12/2020 | Reichel | G06Q 30/0277 |
| 2021/0042786 | A1 * | 2/2021 | Tiruveedhula | G06N 20/10 |
| 2021/0110428 | A1 * | 4/2021 | Lu | G06N 20/00 |
| 2022/0207557 | A1 * | 6/2022 | Siddhartha | G06Q 30/0218 |

* cited by examiner

*Primary Examiner* — Marie P Brady
(74) *Attorney, Agent, or Firm* — Michael A. Springs, Esq.; Shumaker, Loop & Kendrick, LLP; Patrick B. Horne

(57) ABSTRACT

A system for improving distributed network data flow efficiency by using a machine learning model. The system utilizes a personal data set of at least one user and generates a model during training of the machine learning program utilizing at least one neural network with a training data set including the personal data set of the at least one user. The model provides targeted actions based upon analysis of the personal data set of the at least one user and sends a communication to an agent device of an agent, wherein the communication includes the at least one targeted action.

20 Claims, 7 Drawing Sheets

TRAINING AN ARTIFICIAL INTELLIGENCE ENGINE FOR GENERATING MODELS TO PROVIDE TARGETED ACTIONS

FIELD

This invention relates generally to network data flow, and more particularly to utilizing machine learning to improve network data flow efficiency by generating models to provide targeted actions.

BACKGROUND

It is known for a business entity to utilize organized campaigns in order to establish and/or strengthen a relationship between the business entity and participants in the campaign, which may correspond to customers and/or prospective customers of the business entity. The campaign gives a positive impression of the business entity to the participant, and may also may incentivize continued interaction between the participant and the business entity throughout the course of the campaign, as applicable. Such campaigns may also be linked to popular culture or current events, such as having a link to a specific product, holiday season, school event, sporting event, entertainment franchise, or celebrity, which allows for the participant in the campaign to make a shared association between the business entity and the corresponding topic of interest. Such positive interactions occurring between the participant and the business entity can accordingly increase future engagement therebetween, which can in turn result in additional opportunities for the business entity to tender products and/or services to the participant.

Such campaigns or similar customer engagements also provide an opportunity for the corresponding business entity to acquire information regarding each of the participants thereto. For example, it is common for each participant to input certain personal information regarding the identity and contact information thereof when requested to enter into and/or engage with such a campaign. Such campaigns may also request approval for future communications or tenders to be sent to the participant.

It is therefore desirable to produce a system and method utilizing the beneficial aspects of conducting such a campaign in order to acquire additional relevant information regarding each participant in the campaign, where such information can be utilized to improve engagement between the business entity and each of the participants. It is also desirable to produce a system and method configured to determine and provide targeted actions to be taken by an agent of the business entity in reaction to the receipt of such information regarding each of the participants.

SUMMARY

Embodiments of the present invention address the above needs and/or achieve other advantages by providing apparatuses and methods that utilize machine learning to improve network data flow efficiency by generating models to provide targeted actions.

Embodiments of the invention include a system for improving distributed network data flow efficiency using machine learning. The system comprises a computer with one or more processor and memory, wherein the computer executes computer-readable instructions to guide interactions with an agent device; and a network connection operatively connecting the agent device to the computer. Upon execution of the computer-readable instructions, the computer performs steps comprising: providing a personal data set of at least one user; generating at least one model during training of a machine learning program utilizing at least one neural network, a training data set utilized during the training of the machine learning program comprising the personal data set of the at least one user; providing, via the at least one model, at least one targeted action based upon analysis of the personal data set of the at least one user; and sending, via the network connection, a communication to the agent device, the communication including the at least one targeted action.

As aspects of certain embodiments, the computer performs steps further comprising: requesting a response from the at least one user; and storing the response of the at least one user as response data, the response data forming a subset of the personal data set of the at least one user.

As aspects of certain embodiments, the response is requested when the at least one user is enrolling or participating in an organized campaign.

As aspects of certain embodiments, the communication is a perceptible expression including the at least one targeted action related to the at least one user.

As aspects of certain embodiments, the at least one targeted action is related to purchasing a first product and/or service.

As aspects of certain embodiments, the at least one targeted action is related to at least one of a past, current, and future organized campaign.

As aspects of certain embodiments, the at least one targeted action is determined based upon at least one past and current organized campaign that meets at least one parameter set by an agent.

As aspects of certain embodiments, the at least one targeted action provides at least one parameter for at least one future organized campaign.

As aspects of certain embodiments, the at least one targeted action is related to at least one organized campaign conducted during a period of time determined by an agent.

As aspects of certain embodiments, the at least one targeted action is provided when an agent is navigating a software application executed on the agent device.

As aspects of certain embodiments, the training of the machine learning program includes unsupervised learning wherein each of the entries of the training data set is unlabeled.

As aspects of certain embodiments, the machine learning program is configured to perform cluster analysis with respect to the training data set during the training of the model.

As aspects of certain embodiments, the computer is configured to perform at least one of correlation analysis and regression analysis with respect to the personal data set.

As aspects of certain embodiments, the at least one neural network generates a self-organizing map.

As aspects of certain embodiments, the training of the machine learning program includes semi-supervised learning, wherein during the semi-supervised learning the training data set further includes data relating to whether the first one of the users interacted with the first product and/or service following the predicting of the probability of the first one of the users interacting with the first product and/or service.

As aspects of certain embodiments, the training of the machine learning program includes supervised learning with each of the entries of the training data set being labeled.

As aspects of certain embodiments, the personal data set of the at least one user includes demographic data.

As aspects of certain embodiments, the personal data set of the at least one user includes a transaction history of the at least one user.

As aspects of certain embodiments, at least one triggering condition is utilized by the computer in determining when the model should provide the at least one targeted action.

In another embodiment, a method of improving distributed network data flow efficiency using machine learning, comprises the steps of: providing a personal data set of at least one user; generating at least one model during a training of a machine learning program utilizing at least one neural network, a training data set utilized during the training of the machine learning program comprising the personal data set of the at least one user; providing, via the at least one model, at least one targeted action based upon analysis of the personal data set of the at least one user; and sending, via the network connection, a communication to an agent device, the communication including the at least one targeted action.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

Figure 1:
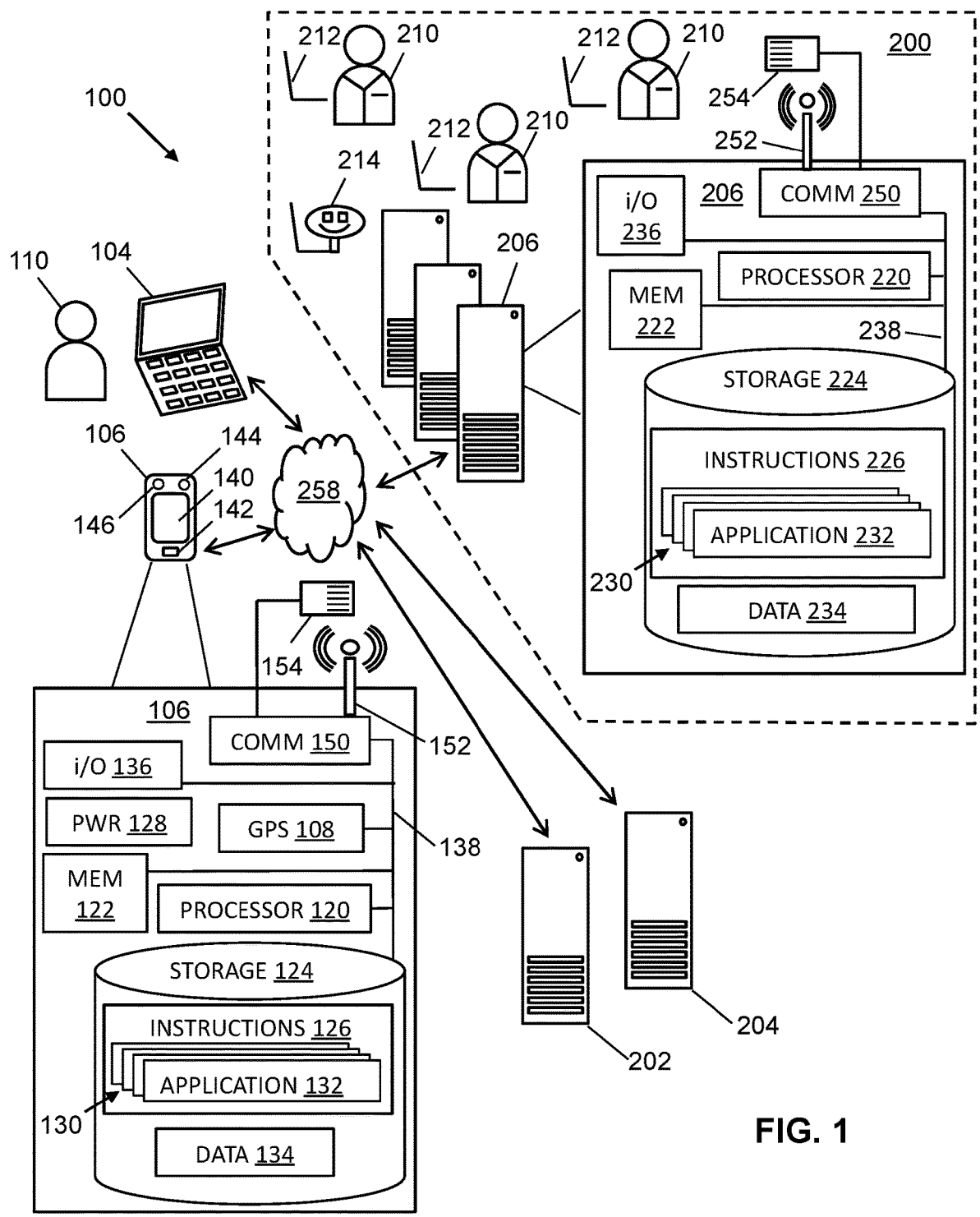
Figure 2A:
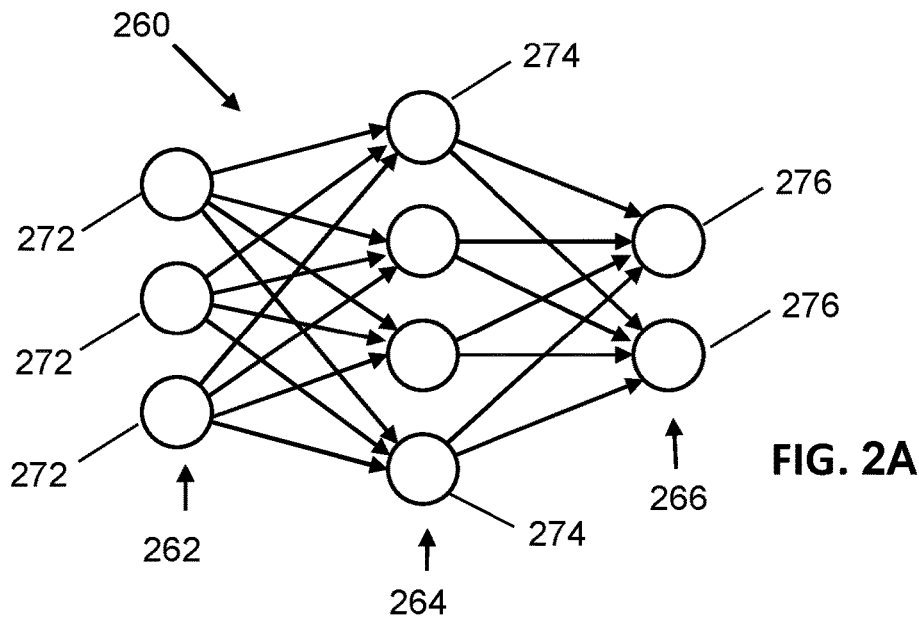
Figure 2B:
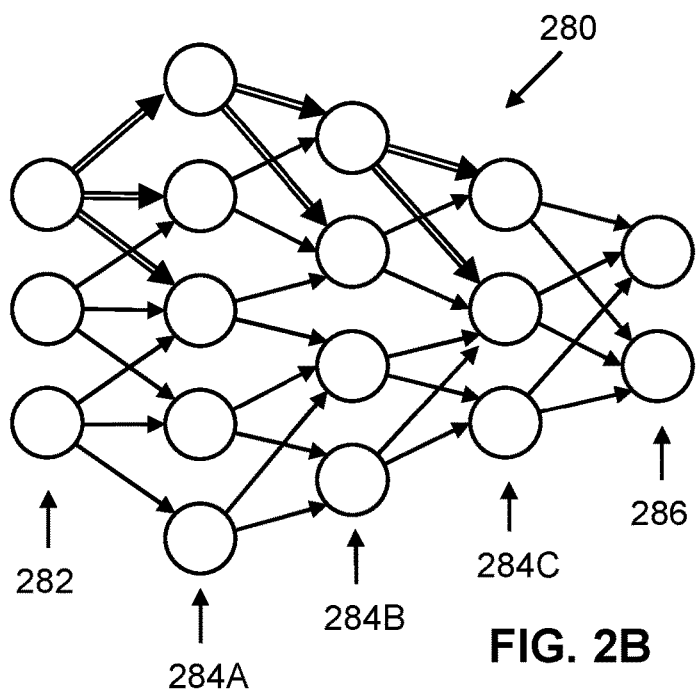
Figure 2C:
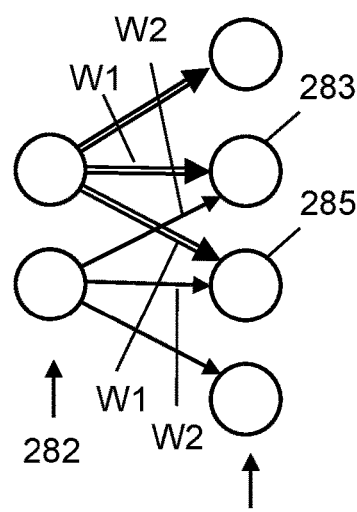
Figure 3:
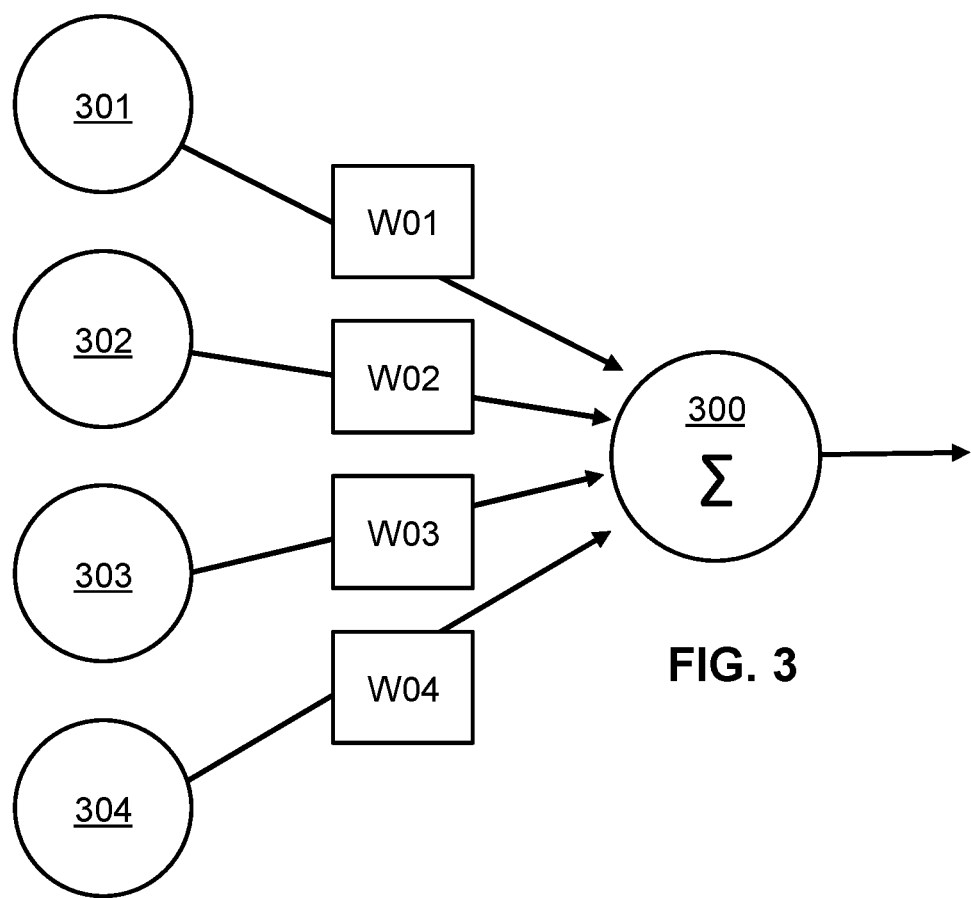
Figure 4:
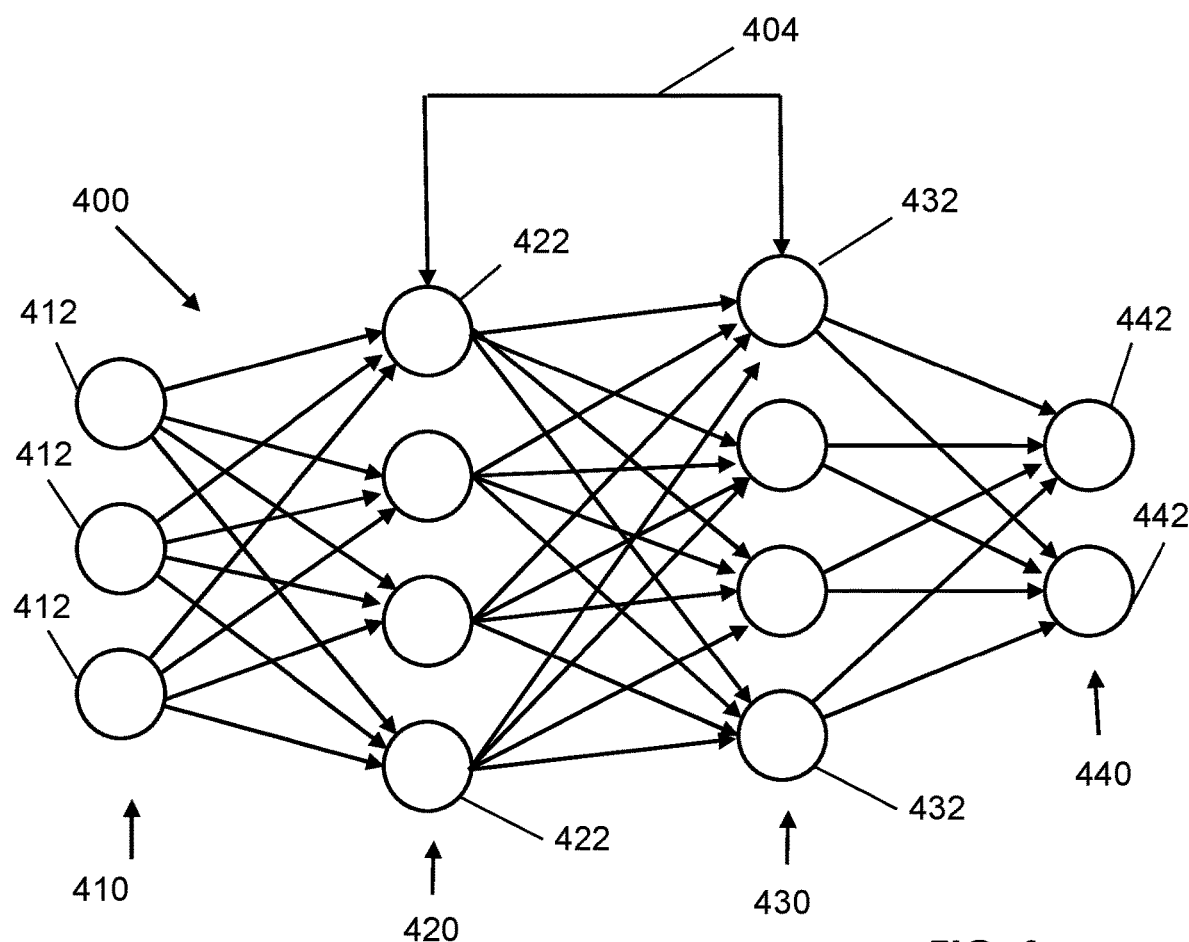
Figure 5:
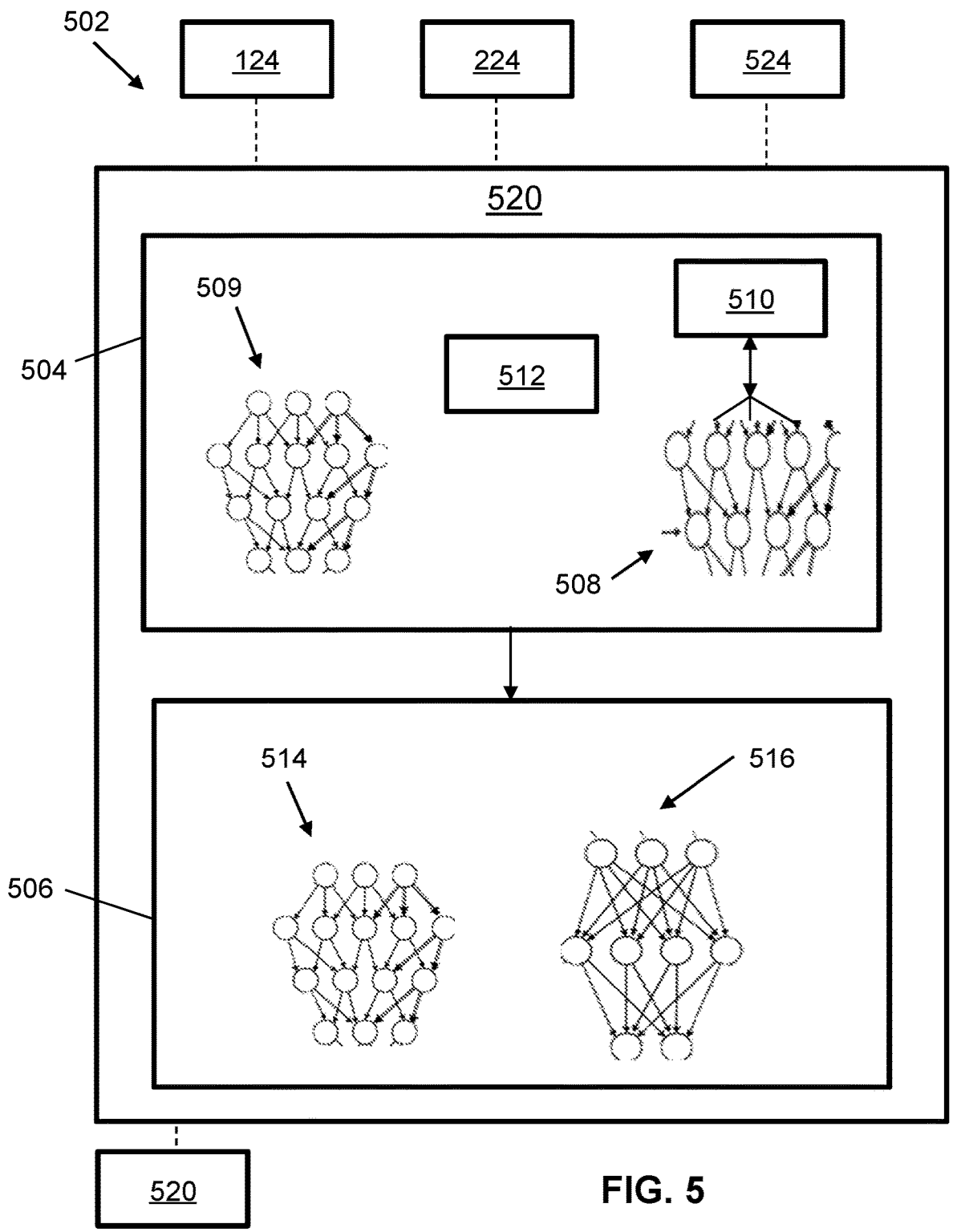
Figure 6:
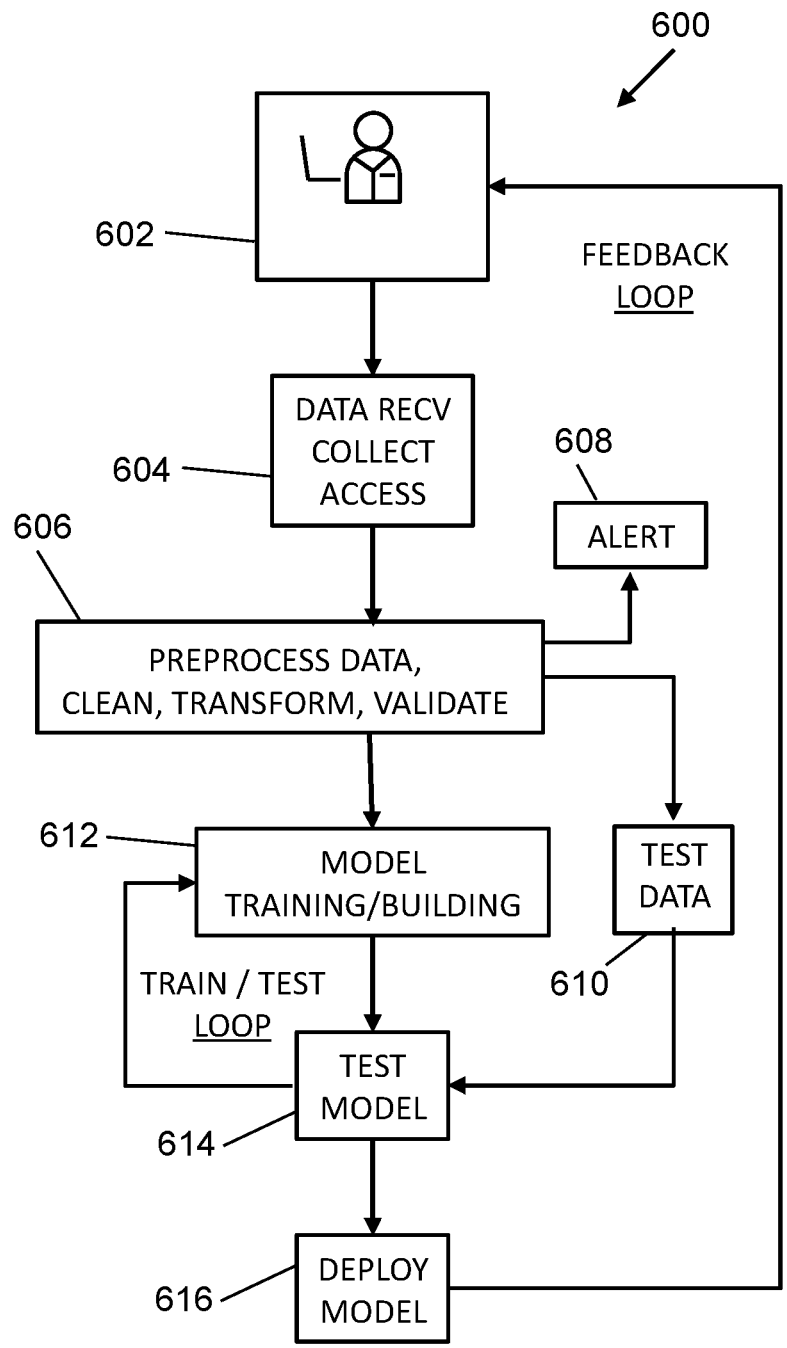
Figure 7:
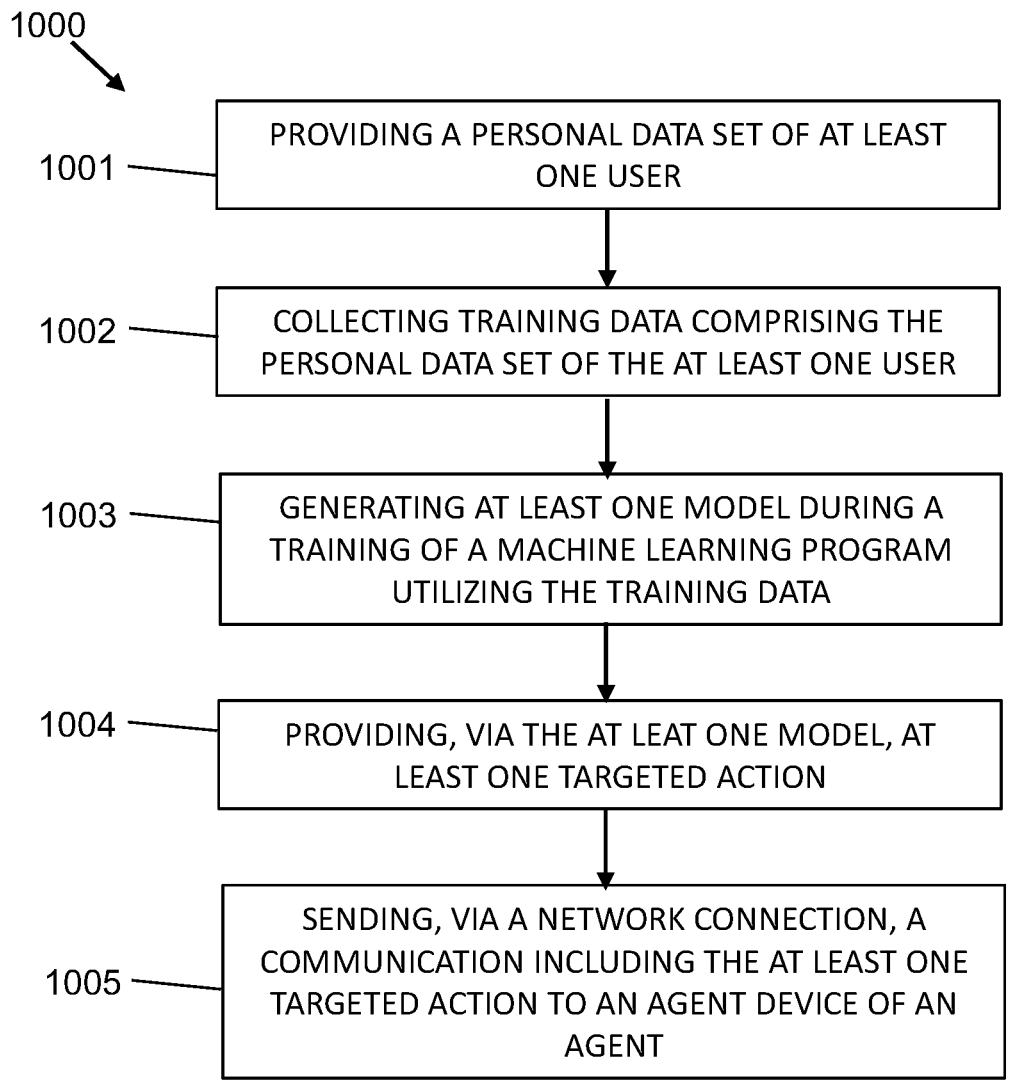

Having thus described embodiments of the invention in general terms, reference will now be made to the accompanying drawings, wherein:

FIG. 1 illustrates an enterprise system, and environment thereof, according to at least one embodiment;

FIG. 2A is a diagram of a feedforward network, according to at least one embodiment, utilized in machine learning;

FIG. 2B is a diagram of a convolution neural network, according to at least one embodiment, utilized in machine learning;

FIG. 2C is a diagram of a portion of the convolution neural network of FIG. 2B, according to at least one embodiment, illustrating assigned weights at connections or neurons;

FIG. 3 is a diagram representing an exemplary weighted sum computation in a node in an artificial neural network;

FIG. 4 is a diagram of a Recurrent Neural Network RNN, according to at least one embodiment, utilized in machine learning;

FIG. 5 is a schematic logic diagram of an artificial intelligence program including a front-end and a back-end algorithm;

FIG. 6 is a flow chart representing a method, according to at least one embodiment, of predictive model development and deployment by machine learning; and FIG. 7 is a flow chart representing a method, according to at least one embodiment, of providing at least one targeted action based on at least one personal data set and communicating the at least one targeted action to an agent of an enterprise system.

DETAILED DESCRIPTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application capable of performing the same or similar tasks to the mobile banking system client application. As used hereinafter, each of the software application associated with the enterprise system 200 and the analogous web browser application capable of performing the same or similar tasks are denoted by reference numeral 132, which may refer to a mobile banking system client application capable of operating on either of the user devices 104, 106.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122. For example, the processing device 120 may be capable of operating a connectivity program, such as the previously described web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like. The application 132 related to the enterprise system 200 may be configured to operate in similar fashion for transmitting such web content.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can tender any number or type of services and products to one or more users 110. In some examples, an enterprise system 200 tenders products. In some examples, an enterprise system 200 tenders services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-tendered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications tendering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical predictive model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. The present invention may include a machine learning program that may be executed by the processor 220 of the computing system 206 associated with the enterprise system 200, and may utilize the data 234 stored to the storage device 224. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can, in a sense, learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 204 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 204 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of predictive model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to predictive modeling the problem with which the algorithm is associated. Supervised training of the neural network may include choosing a network topology suitable for the problem being predictive modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network (CNN). A CNN is a type of feedforward neural network that may be utilized to predictive model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the predictive model.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language predictive modeling to predict the next word in a string based on the previous words. The RNN(s) of the machine learning program may include a feedback system suitable to provide the connection(s) between subsequent and previous layers of the network.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN network 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine learning program may include a relatively large number of layers, e.g., three or more layers, and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., memory device 124 and/or memory device 224) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical predictive models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or predictive model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data, which may also have the same distribution.

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

FIG. 6 is a flow chart representing a method 600, according to at least one embodiment, of predictive model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained predictive model. As newly trained predictive models are tied to a set of versioned data, preprocessing steps are tied to the developed predictive model. If new data is subsequently collected and entered, a new predictive model will be generated. If the preprocessing step 606 is updated with newly ingested data, an updated predictive model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, predictive model training, a core step of the machine learning work flow, is implemented. A predictive model architecture is trained in the iterative training and testing loop. For example, features in the training test data are used to train the predictive model based on weights and iterative calculations in which the target variable may be incorrectly predicted in an early iteration as determined by comparison in step 614, where the predictive model is tested. Subsequent iterations of the predictive model training, in step 612, may be conducted with updated weights in the calculations. updated weights in the calculations.

When compliance and/or success in the predictive model testing in step 614 is achieved, process flow proceeds to step 616, where predictive model deployment is triggered. The predictive model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

The present invention relates to the creation of a predictive model for predicting the traits and/or behavior of a user 110 based on the training of a machine learning program. The machine learning program of the present invention is described hereinafter as utilizing the data sets associated with a plurality of the users 110 of the enterprise system 200. As mentioned hereinabove, each of the users 110 may be a person or entity acting as a customer or client of the enterprise system 200 that utilizes products and/or services originating at least in part from the enterprise system 200 as defined herein, or may otherwise be a person or entity having an established relationship with the enterprise system 200 such that the enterprise system 200 has access to the necessary personal data regarding each of the participating users 110 for making the determinations described hereinafter. The relationship present between the enterprise system 200 and each of the users 110 may include one or more of the users 110 having an account with the enterprise system 200 wherein certain interactions between the enterprise system 200 and each of the users 110 may be monitored and recorded by the computing system 206, as described in greater detail herein. Alternatively, if not already customers or clients, one or more of the users 110 may be representative of persons or entities that are considered to be potential or prospective customers or clients, such as those persons or entities for which the computing system 206 has the necessary data allowing for the enterprise system 200 to identify and then communicate with the corresponding person or entity to tender such products and/or services.

The machine learning program utilizes personal data regarding each of the users 110 of the enterprise system 200. The personal data of each of the users 110 of the enterprise system 200 may be in the form of the data 234 stored to the storage device 224 of the computing system 206 as utilized for carrying out the functions of the machine learning program as described herein. The data 234 may originate from various different sources including the responses of the user 110 to queries from the enterprise system 200, the recorded interactions of the user 110 with the enterprise system 200, or one or more third-party and external sources or systems, which may be representative of the previously disclosed external systems 202, 204.

The present invention relies upon the enterprise system 200 having access to the personal data associated with each associated user 110 in order to train the machine learning program and subsequently utilize the predictive model generated thereby. In some embodiments, the invention may be carried out with respect to a user 110 having an established account with the enterprise system 200, wherein the establishment of an account may include the user 110 providing at least some of the entries of the associated personal data to the enterprise system 200. The enterprise system 200 may collect data regarding the user 110 by directly querying and recording the responses of the user 110. Such data may be entered via use of the web browser application or software application 132 associated with the enterprise system 200, and such information may be entered by the user 110 via use of the user device 104, 106 executing the corresponding application 132. The data provided to the enterprise system 200 regarding the user 110 may include, as non-limiting examples, the gender, age, income level, employment status, home ownership status, marital status, citizenship status, etc. of the corresponding user 110. Any available demographic data regarding the user 110 may form a portion of the personal data utilized by the machine learning program with respect the user 110.

If the enterprise system 200 is representative of a financial institution or mobile banking system, the personal data accessible to the enterprise system 200 regarding the user 100 may include data regarding products and/or services tendered to the user 110 by the enterprise system 200 relating to banking, checking, savings, investments, credit cards, automatic-teller machines, debit cards, loans, mortgages, personal accounts, business accounts, account management, credit reporting, credit requests, and credit scores, as non-limiting examples. The data may further include files such as those for user accounts, user profiles, user account balances, user transaction histories, user investment portfolios, past communications with the user, or files downloaded or received from other devices such as the user devices 104, 106 of the user 110.

In some circumstances, such as when the enterprise system 200 is representative of a financial institution or mobile banking system tendering typical banking services and products, the enterprise system 200 may have access to data regarding the transactions of the user 110 as facilitated by the enterprise system 200. For example, transaction histories regarding purchases carried out via a credit card or debit card associated with the enterprise system 200 may be accessible to the computing system 206, as well as current or prior account balances of such accounts.

The enterprise system 200 may also be configured to monitor and record specific interactions of the user 110 with the enterprise system 200 in attaining additional data regarding the user 110 that may be utilized by the machine learning program disclosed herein. For example, in the event that the user 110 has an account with the enterprise system 200, the user 110 may be required to provide authentication data to the web browser application or software application 132 associated with the enterprise system 200. Following such a login process, the enterprise system 200 may monitor and record the interactions of the identified user 110 with the interface of the corresponding application 132 in order to accumulate data associated with the user 110. For example, the enterprise system 200 may monitor data such as the number of logins to the account of the user 110 in a specified period of time, the frequency of the logins of the user 110, the duration of time the user 110 remains logged into the application 132 (while remaining active), and the types of products and/or services interacted with and/or purchased by the user 110 via navigation of the corresponding application 132. Data may also be recorded regarding the navigation of the application 132, such as recording which resources the user 110 has accessed, how long such resources were accessed, or the like, such as referencing which web addresses associated with the application 132 have been accessed by the user 110 or which files related to the application 132 have been accessed by the user 110.

The personal data regarding the user 110 may also include data relating to the account settings of the user 110 as established with respect to the computing system 206. Such account setting data may be stored to the storage device 224 of the computing system 206 and may be associated with determining how the computing system 206 interacts with the user 110 via the corresponding user device 104, 106. For example, such account setting data may include data relating to the frequency of communications sent from the computing system 206 to the user 110 for access via the user device 104, 106, under what conditions to communicate with the user 110, the content of such communications, the types or forms of such communications, the manner in which the interface of the web browser application or software application 132 displays information to the user 110, or the information or resources accessible to the user 110 via navigation of the web browser application or software application 132, as non-limiting examples.

In other circumstances, the personal data may be representative of data acquired regarding the user 110 during web related activities, such as tracking a web browsing history of the user 110, as may be provided by "cookies" or similar tools, or tracking certain communications of the user 110, such as monitoring certain aspects of the email activity of the user 110. If web related activities are monitored, such data may correspond to the activities of the user 110 with respect to the webpage or software application 132 associated with the enterprise system 200 or may relate to the activities of the user 110 with respect to third party applications or websites. Such data may be communicated from a corresponding user device 104, 106 used to perform the web browsing to the computing system 206 for storage to the storage device 224 as a form of the data 234.

The enterprise system 200 may also utilize data originating from one of the external systems 202, 204, which may be representative of personal data accumulated with respect to the user 110 external to the enterprise system 200 that is available to or otherwise accessible by the computing system 206 via interaction with one or more of the external systems 202, 204. The external systems 202, 204 may accordingly be representative of third-party data providers configured to communicate data to the computing system 206 regarding the user 110. Such data may include a credit history of the user 110 or transactions of the user 110 with respect to other business entities, as may originate from sources others than the enterprise system 200. Further examples include data originating from third party social networks or the like, such as check-ins at certain establishments, social connections to other users, posting or commenting histories, or interactions with certain other users or business entities. Data regarding a transaction history of the user 110, whether derived from the relationship between the user 110 and the enterprise system 200 or the user 110 and a third party external system 202, 204, may include data regarding the establishments at which the user 110 has made the purchases, the amounts of such purchases, and potentially additional information regarding the products and/or services related to such purchases. Such data may be available via records of the credit or debit purchases made by the user with respect to certain establishments as monitored by the third party external system 202, 204.

The personal data collected with respect to each user 110 may be categorized as demographic data regarding the user 110, behavioral data regarding the activities of the user 110, and behavioral data regarding the activities of the enterprise system 200 with respect to the user 110 (such as data relating to communications from the enterprise system 200 to the user 110 regarding educational materials or data relating to tenders for the purchase of products and/or services). The demographic data generally refers to the data regarding the user 110 that corresponds to a trait or characteristic of the user 110 by which the user 110 may be categorized or classified, whereas the behavioral data generally refers to data regarding the recordation of information regarding the actions of the user 110, the actions of the enterprise system 200, or past interactions or transactions occurring between the enterprise system 200 and the user 110.

The personal data set associated with at least some of the users 110 may also include at least one entry of response data, wherein such response data may refer to data regarding the response(s) of the participating users 110 of the enterprise system 200 to one or more queries. Each of the users 110 may be alternatively referred to as a respondent of one or more of the queries when discussing the querying process hereinafter. The response data may be available for only some of the plurality of the users 110 of the enterprise system 200, depending on the responsiveness of such users 110 to such queries or the distribution of such queries being posed to the plurality of the users 110. As used herein, a query may refer to any question answered by a respondent for the purpose of collecting data regarding the opinions, feelings, thoughts, beliefs, impressions, predictions, and/or observations of the respondent. The response data may be accumulated using any known method so long as the response data is recorded in a form configured for use with the computing system 206 and the corresponding machine learning program executed thereon. In some embodiments, the querying of each of the users 110 may be conducted online via the web browser or software application 132 corresponding to the enterprise system 200 as operating on the user device 104, 106 of the respondent, as explained in greater detail hereinafter.

Each of the queries may be linked to a corresponding campaign as tendered by the enterprise system 200 or an affiliate thereof, hence the users 110 having provided such responses may be indicative of those users 110 having participated in such campaigns. In some circumstances, the corresponding campaign has some connection or relationship to a topic such as a sporting season, a holiday season, popular culture event, corporation, persona, celebrity, product, entertainment franchise, sporting event/tournament/league, or the like. Such a relationship may be utilized in the campaign or may include an object of the campaign having a specific relationship to the topic in question. For example, if the topic associated with the campaign is a sporting event, the sporting event may be utilized in the campaign or may be related to an object tendered as a part of the campaign. The manner in which the campaign and/or the object of the campaign is related to a specific topic may aid in providing increased engagement of each participating user 110 by relating to a topic of interest to the user 110, or to a topic of perceived knowledge of the user 110. Such increased engagement may lead to an increased likelihood of participation in the corresponding campaign, and hence access to the query or queries associated with such campaign.

The queries may include content that directly or indirectly relates to the topic of the materials and/or an object of the campaign. For example, if an object such as an automobile is being tendered as the object of the campaign, the queries related to the corresponding campaign may relate to whether or not the participating user 110 has insurance, is satisfied with said insurance, or has an interest in changing said insurance. As another example relating to the automobile as the object of the campaign, the query may relate to what products and/or services the user 110 would purchase if not responsible for a monthly automobile payment. If a monetary award is tendered, the query may relate to what investment activities or purchases the user 110 expects to make following receipt of the monetary award. The query may include the user 110 providing a preference for or interest in one or more products and/or services tendered by the enterprise system 200 that would be likely to be purchased with such a monetary award.

The queries may alternatively relate to collecting or updating certain demographic or behavioral data regarding the user 110 that has otherwise been unable to be collected/updated. Such responses may accordingly aid in providing further correlations to similar users 110 by expanding the data set upon which correlations can be discovered and implemented.

The queries may directly relate to the preferences of the user 110 regarding certain account settings or other interactions with the computing system 206 and/or enterprise system 200. For example, a query may request the impressions of the user 110 on the performance of the enterprise system 200 in meeting the needs of the user 110 with respect to certain products and/or services tendered by the enterprise system 200. As another example, a query may relate to the preferences of the user 110 regarding the number, form, and content of certain communications sent to the user 110 by the computing system 206 as may be represented in the account settings of the user 110, such as a preference for paperless communication.

The queries may also relate to evaluating certain predictions made by the machine learning program of the present invention. For example, the predictive model of the machine learning program may be configured to determine a propensity for a user 110 to have a certain preference, and the predictive model may be evaluated, and potentially further trained and refined, by querying the user 110 regarding the prediction of this preference.

The queries are not necessarily limited to being associated with a specific campaign or topic of interest. In some circumstances, the queries may be associated with a survey proactively tendered to at least some of the users 110 for attaining additional personal data regarding any of the disclosed forms of personal data herein.

Although the response data has been described as originating from the interactions between the corresponding user 110 and the computing system 206 of the enterprise system 200, the response data may originate from any source without necessarily departing from the scope of the present invention. In some embodiments, the querying is conducted by the enterprise system 200 according to any of the processes discussed above, and the resulting response data is stored to the storage device 224 as one form of the data 234 associated therewith. In other embodiments, the response data is accumulated by a third party associated with the campaign and/or corresponding survey (or the like), and the resulting response data is communicated to the storage device 224 for storage as a form of the data 234. The third party conducting the querying and accumulating the response data may be representative of one of the external systems 202, 204 shown and described as being in communication with the computing system 206 with reference to FIG. 1. In such a circumstance, the user device 104, 106 of the user 110 may be utilized to respond to the queries via the web browser application or via a software application associated with the third party external system 202, 204 responsible for making the queries, and such data may be communicated from the external system 202, 204 to the computing system 206 by any known method, or may alternatively be communicated directly from the user device 104, 106 to the computing system 206, as desired.

A response data set associated with each individual user 110, which is a subset of the personal data set of that same user 110, may include a data entry with respect to each query asked of and answered by the corresponding user 110. In some circumstances, only a single query or single set of queries asked substantially contemporaneously may form the response data set of the corresponding user 110, whereas in other circumstances, the corresponding user 110 may include response data entries with respect to a plurality of independently conducted campaigns/surveys, each of which may be associated with one or more response data entries, depending on the format of the campaign/survey and the types of queries posed.

A personal data set associated with any individual user 110 may accordingly include entries of any of the different types of data disclosed hereinabove, including entries relating to demographic data, behavioral data, and response data. Each entry of the personal data set may be representative of one of the demographic traits of the user 110, one of the behavioral traits of the user 110, one of the behavioral traits of the computing system 206, or one of the responses of the user 110 to a corresponding query. The number or types of entries available in each personal data set may vary among users 110 depending on the relationship to the enterprise system 200 and the availability of such data, as well as the participation of such users 110 in responding to such queries as a result of participation in the corresponding campaign/survey. Some entries of the personal data set of some users 110 may accordingly be empty or may include assumed or predicted data, as desired, when utilized by the corresponding machine learning program.

As used in various examples hereinafter, the personal data set of at least one of the users 110 may include at least one data entry related to a past purchase or an ongoing use (active status) of a product and/or service by the corresponding user 110 as tendered by the enterprise system 200, or to the lack of the purchase or use of such a product and/or service by the corresponding user 110. The personal data set of at least one of the users 110 may also include at least one data entry related to the frequency of use or manner of use of a certain product and/or service provided by the enterprise system 200 for use by the corresponding user 110. The product and/or service for which the frequency or classification of use is collected may correspond to the previously mentioned product and/or service for which the data regarding the past purchase or ongoing use is collected. For example, if the corresponding user 110 has an established credit card account with the enterprise system 200, the personal data set of the corresponding user 110 may include a data entry relating to the active status of the credit card account (thereby indicating the past purchase or ongoing use thereof), a data entry relating to the frequency of use of the credit card account, and at least one data entry relating to the types or amounts of the transactions carried out with the credit card account. The personal data set of the corresponding user 110 may also include data entries relating to the lack of purchase and/or use of other products and/or services also provided by the enterprise system 200, such as alternative financial products and/or services that the user 110 is not currently utilizing. The personal data set of the corresponding user 110 may also, where applicable, include data entries relating to the purchase and/or use of products and/or services provided by a third-party entity, such as entities representative of competitors to the enterprise system 200. For example, the personal data set may include data entries that indicate the presence of other credit card accounts associated with the corresponding user 110 with respect to third-party financial institutions and any available data regarding the frequency or manner of use of such third-party credit card accounts. As evidenced by the examples set forth hereinafter, it should be appreciated that the personal data set associated with each of the users 110 may include any combination of the data described as being available to the computing system 206 herein while remaining within the scope of the present invention.

The present invention relates to various different machine learning processes carried out by the computing system 206 of the enterprise system 200 and suitable for predicting the behavior of a specific user 110 based on the personal data set thereof at the time of the desired prediction. The machine learning program may utilize any of the processes described herein, alone or in combination, while remaining within the scope of the present invention. The described processes are drawn towards determining a propensity or probability for the specific user 110 to purchase and/or otherwise interact with or utilize a specific product and/or service tendered by the enterprise system 200 based on the predictive capabilities of a corresponding predictive model generated by the machine learning program, or, alternatively, to predict the response of a user 110 to a specific query in determining an additional task to take with respect to the corresponding user 110.

A training data set utilized in performing the training of the associated predictive model of the machine learning program may comprise any subset of the described types of personal data described herein with respect to a plurality of the users 110, so long as the personal data set of at least some of the users 110 forming the training data set include response data therein indicative of those users 110 having responded to a query as described herein. The training data set may include the use of all entries of the personal data set associated with each of the users 110 or may include the use of only specific data entries associated with each of the users 110, such as only certain demographic data, certain response data, or certain data relating to the purchase and/or use of certain products and/or services tendered by the enterprise system 200. The training data set may be limited to the personal data sets of only those users 110 having a specific classification based on an analysis of the personal data set of each of the users 110 for which the computing system 206 has the necessary data. For example, the training data set may be limited to only those users 110 having an active account with the enterprise system 200, only those users 110 fitting into a specific demographic classification such as exceeding a certain age, only those users 110 that have already purchased or are currently utilizing a selected product and/or service tendered by the enterprise system 200, only those users 110 that have not already purchased or utilized a selected product and/or service tendered by the enterprise system 200, or only those users 110 having responded to a corresponding query. The training data set may also include each of the data entries described as relating to a behavior such as the purchase and/or ongoing use of a particular product and/or service being limited to those activities having occurred within a given time frame, such as those data entries representative of activity having occurred within the past month, the past 6 months, the past year, or any alternative time frame.

According to some embodiments of the present invention, the machine learning program utilizes unsupervised learning for determining relationships between the different data entries utilized in the training data set comprised of the personal data of the plurality of the users 110. The unsupervised learning includes the training data formed by the personal data of the plurality of the users 110 being unlabeled with respect to all entries. As such, none of the different possible data entries is representative of a form of known output during the process of training the machine learning program. Each of the different data entries regarding a specific user 110, whether personal data entries relating to demographic classifications, responses to queries, or past interactions or behaviors of the specific user 110 and/or enterprise system 200, may therefore form an independent unlabeled input for performing the unsupervised learning of the machine learning program.

As used hereinafter, the personal data set comprising the personal data of a corresponding one of the users 110 that is utilized in training the machine learning program or performing a prediction via the predictive model generated by the machine learning program may alternatively be referred to as the personal data profile of the corresponding user 110 at the time at which such personal data set is utilized by the machine learning program. For example, one specific user 110 may include a personal data profile including a combination of demographic data regarding the specific user 110 (age, income level, marital status, etc.), data regarding recorded interactions the specific user 110 has engaged in with the enterprise system 200 (account transaction history, application browsing history, etc.), including the purchase and/or use of certain products and/or services, and data relating to the responses to the queries. The personal data profile of a specific user 110 is accordingly different each time the personal data set regarding the user 110 as utilized by the machine learning program in making a prediction changes, such as when certain entries indicate a change in value or a change in state or condition with respect to at least one entry of the personal data set of the user 110.

The machine learning program may be configured to perform cluster analysis wherein the training data constituting the different entries of the personal data is grouped into subsets (clusters) wherein each cluster is determined by the similarity of the data contained within the cluster with respect to a plurality of the users 110, or the dissimilarity with respect to data not within the cluster with respect to the plurality of the users 110, depending on the methodology utilized. That is, each cluster includes a plurality of the users 110 identified as forming the cluster having met a threshold degree of similarity among the data corresponding to the plurality of the users 110 according to a predefined similarity criteria. This clustering allows for users 110 having a similarity of personal data profile, such as a certain set of demographic traits, behavioral traits, and response based traits, to be grouped together in such clusters.

For example, a cluster of a plurality of the users 110 may include each of the users 110 having a first demographic trait indicated by a first data entry, a second demographic trait indicated by a second data entry, a first product trait relating to the use of a first product indicated by a third data entry, a second product trait relating to the use of a second product indicated by a fourth data entry, and a first response trait relating to a specific response to a query. Such a cluster may be indicative of other users 110 that also share the first demographic trait, the second demographic trait, the first product trait, and the first response trait having an increased propensity to also share the second product trait. Alternatively, such a cluster may be indicative of other users 110 that also share the first demographic trait, the second demographic trait, the first product trait, and the second product trait having an increased propensity to also share the first response trait, thereby indicating that the other users are likely to respond to the query in the same manner. Such associations may be utilized to determine the probability of a specific user 110 being likely to take an action resulting in the personal data set of the user 110 changing in a manner indicative of a change in a specific data entry of the personal data set. The unsupervised learning process accordingly allows for causality to be implied between a particular personal data entry, such as an entry relating to the purchase or use of a specific product and/or service, and any other subset of the personal data set, such as any combination of demographic or behavioral data relating to other products and/or services, by discovering a correlation between such common occurrences of these data within the training data. Similarly, the unsupervised learning process may allow for causality to be implied between a particular response to a query and any other subset of the personal data set, such as any combination of demographic data, behavioral data, or response data.

In certain embodiments, the machine learning program may be configured to determine a probability that a certain personal data profile of a specific user 110 will correspond to a certain data entry related to the purchase and/or use of a specific product and/or service tendered by the enterprise system 20. Alternatively, the machine learning program may be configured to determine a probability that a certain personal data profile of a specific user 110 will correspond to a certain data entry relating to a specific response to a specific query. The predictive model generated by the machine learning program may be configured to assign a value to the likelihood that any specific data entry may be expected to change or have a certain value or state within the personal data set of the specific user 110, where such a change in value/state or absolute value/state may be indicative of a new purchase or change in use of the corresponding product and/or service by the specific user 110, or may be indicative of a specific response to a query posed to the user 110. Although described as a probability in each case, it should be appreciated that the machine learning program may alternatively assign binary outcomes to any specific data entry, such as determining whether a purchase or specific response is not going to occur (0) or going to occur (1) based on the predictive model, as desired.

With reference to a previously provided example, it may be discovered via application of the predictive model using cluster analysis that a specific user 110 having the first demographic trait, the second demographic trait, the first response trait, and the first product trait, but not the second product trait, may have a relatively high probability of eventually changing the second product trait to match that of the users 110 forming the most similar cluster to the specific user 110, such as eventually purchasing or using the second product, based on the manner in which similar users 110 assigned to that cluster had previously purchased or used the second product according to the data relating to the second product trait of these similar users 110. Similarly, it may be discovered via application of the predictive model that a specific user 110 having the first demographic trait, the second demographic trait, the first product trait, and the second product trait, but who has not yet responded to a specific query, may have a relatively high probability of choosing a response to the specific query that matches those of the users 110 forming the most similar cluster to the specific user 110, based on the manner in which similar users 110 assigned to that cluster had previously answered this same query.

It is understood that the predictive model may use other statistical methods of analysis such as correlation analysis and regression analysis, for example, to analyze the personal data set of the at least one user 110 to provide the targeted actions.

The unsupervised learning process may be utilized exclusively to form the predictive model of the machine learning program wherein predictions may be made regarding the likelihood of any specific entry having a specific value/state or a specific change in the value/state of an entry occurring with respect to any of a number of different characteristics associated with the user 110 for which the predictive model is being applied. The personal data profile of the user 110 may be utilized to determine the likelihood of any number of different entries having a specific value/state or change in value/state indicative of a certain relationship being present between the user 110 and the enterprise system 200, including the determination of the probability of multiple different data entries associated with multiple different products and/or services having a certain value/state and/or changing in value/state in the future, or the likelihood of a user 110 responding to any specific query in a specific manner. Such predictive modeling may accordingly allow for the personal data profile of any specific user 110 to be utilized in determining the likelihood of the specific user 110 in making a purchase or agreeing to use any number of the specific products and/or services as supplied by the enterprise system 200, or in determining the likelihood that the user 110 will provide a specific response to a specific query.

In other embodiments, the unsupervised learning process may be utilized to discover those variables among the personal data entries used in the training data set that show correlation or causality in making predictions via one or more other predictive models associated with the machine learning program. These other predictive models may utilize supervised training wherein only those data entries shown to be of predictive value in making an association between the different users 110 during the unsupervised training are utilized, as desired.

The present invention may also utilize a semi-supervised learning process wherein the personal data set associated with each of the users 110 is monitored following a prediction with respect to one of the corresponding data entries such that certain data entries may be subsequently classified as labeled data during further training of the machine learning program. For example, the machine learning program may be drawn towards determining the likelihood of a plurality of users 110 choosing to purchase first product within the next six months. Six months from the prediction of the purchase, each of the users 110 for which a prediction was made may have their instantaneous personal data set utilized as a part of the training data used in further training of the predictive model, with those entries relating to the actual purchase or lack of purchase of the first product being considered labeled data. The use of such labeled data allows for the data related to the first product to be considered a form of output data that can further inform the predictive model by evaluating the precision or accuracy of the predictions made by the previous iteration of the predictive model. As another example, the predictive model may predict the response of a specific user 110 to a specific query, and may then compare the actual response of the user 110 to the predicted response upon the user 110 later responding to the query. The response data relating to such a response would once again be considered the labeled data entry utilized in the training data set of such a training process.

The machine learning program may alternatively, or additionally, utilize supervised learning according to any of the supervised learning processes or tools disclosed herein. The supervised learning process may include the data entry or entries relating to a desired product and/or service being labeled as an output while the data entries relating to the remaining personal data of each of the users 110 forming the training data (including, where applicable, the response data set of the corresponding user 110) are labeled as inputs into the corresponding predictive model. As such, the supervised learning process may include the output of the predictive model corresponding to the probability or likelihood of a specific event occurring, such as the purchase or use of a specific product and/or service by the corresponding user 110, whereas the input into the predictive model relates to the remaining personal data of the corresponding user 110 for which the prediction is being made. As another example, the supervised learning process may include the output of the predictive model corresponding to the probability or likelihood of a specific response occurring with respect to a specific query posed to a specific user 110, whereas the input into the predictive model relates to the remaining personal data of the corresponding user 110 for which the prediction is being made. The supervised learning process may accordingly result in a predictive model that similarly provides information relating to a probability or likelihood that a specific event will occur (or is already occurring) as indicated by at least one entry of the personal data set of the user 110 for which the prediction is being made, such as the eventual purchase or use of a product and/or service or the eventual selection of a specific response to a specific query.

Regardless of the methodology utilized, the training process may include the training data utilized in forming the predictive model divided into initial training data and validation training data. The initial training data may be utilized to create an initial predictive model configured to make a prediction with respect to at least one of the data entries of the user 110 associated with the user 110 purchasing or using a specific product and/or service or giving a specific response to a specific query. The validation training data may then be utilized to make predictions regarding each of the users 110 comprising the validation training data that can be evaluated relative to the already known data entries relating to such predictions. For example, the data entries of a user 110 not relating to the desired product and/or service may be utilized to make a prediction regarding the purchase or use of the desired product and/or service as indicated by one of the data entries, wherein the actual value of this data entry is already known from the entirety of the validation training data. The predicted outcome may then be compared to the actual outcome, as indicated in the known validation training data, and the accuracy and precision of the predictive model may then be evaluated based on the training that occurred with respect to the initial training data. Any difference between the predicted outcome and the actual outcome may also be utilized as an error signal for correcting the predictive model according to the corresponding methodology thereof during the validation process.

Once the corresponding predictive model is shown to make predictions or determinations having a desired degree of accuracy or precision in accordance with the desires of the enterprise system 200, the predictive model may be subjected to further training by evaluating the predictions made with respect to at least some of the users 110 at a first instance to the actual data entries of those same users 110 at a second instance. For example, the predictive model may be configured to predict the likelihood that a specific user 110 having a corresponding personal data profile will purchase a first product within the next six months, wherein such a prediction is made at a first instance. The machine learning program may be further trained by evaluating the personal data profile of that same user 110 at a second instance, which is six months after the first instance, to determine if the data entry indicative of the purchase of the first product has changed at the second instance in accordance with the prediction made at the first instance. As another example, the predictive model may be configured to predict the likelihood that a specific user 110 having a corresponding personal data profile will give a specific response to a specific query when posed to the user 110. The machine learning program may be further trained by evaluating the personal data profile of that same user 110 upon responding to the query to determine if the data entry indicative of the chosen response occurred in accordance with the prediction of the predictive model. Such data utilized in confirming the predictions of the predictive model may be referred to as the testing training data hereinafter. Such testing training data may accordingly be utilized to further refine the predictions made by the predictive model by evaluating the real world outcomes of the predictions made by the predictive model.

FIG. 7 illustrates a method 1000 of implementing the machine learning program for providing targeted actions based on a personal data set of the user 110 according to the present invention. The method includes an initial step 1001 of providing the personal data set of the user 110. In some embodiments, the personal data set of the user 110 may be created by querying a single user 110 or a plurality of the users 110 for attaining one or more responses forming response data entries utilized in the training data set. As mentioned above, the querying may be conducted directly by the enterprise system 200 or by a third party external source 202, 204, and may be initiated at the request of the user 110 via participation in an organized campaign, the enterprise system 200 via a corresponding communication or request, or the third party external source 202, 204.

In some embodiments, the user 110 utilizes the web or software application 132 associated with the enterprise system 200 to conduct the process of responding to a specific query. In some circumstances, the campaign may be made known to each of the users 110 via an appropriate communication or advertisement, which may be made available via email, radio, television, social media, print and online platforms, multimedia, push notification, and/or display via an interface of the application 132, as non-limiting examples. Upon determining to participate in such a campaign, the user 110 may be queried during a process of enrolling in the campaign, and such query make take any of the forms described herein and may be directed towards any of the different subject matters described herein. The querying may include multiple queries being asked substantially contemporaneously, wherein each response is stored as an individual entry of the response data set corresponding to that user 110. The completion of one or more of the queries may be made a term for eligibility in the underlying campaign to ensure participation in responding to such queries when posed. For example, providing responses to the queries may be necessary to continue on during the process of enrolling in the campaign, such as not progressing to the next step of the enrollment process unless such queries are addressed appropriately in accordance with the terms of the campaign.

In some circumstances, the campaign may include multiple different stages or periods of engagement or interaction with the user 110, such as engaging the user 110 throughout a holiday season, a back to school season, a sports season or sports tournament where the outcome of individual games (or the like) are correlated to the success of the user 110. Such campaigns may require periodic or continued interaction from the user 110 as conditions change depending on the format of the campaign. Such campaigns may also include features wherein the user 110 may desire to login to the account of the user 110 via the web or software application 132 to track the progress of the user 110. Each of the these continued engagements or interactions with the user 110 may be utilized as opportunities for the computing system 206 to further query the user 110, hence some campaigns may be associated with multiple different instances of the queries being posed to a specific user 110, and hence multiple different queries or sets of queries.

In some other embodiments, the queries may not be linked directly to a campaign and may instead be utilized with respect to alternative interactions occurring between the computing system 206 and the user device 104, 106 of the corresponding user 110. For example, such queries may be posed to the user 110 when navigating the web or software application 132 associated with the enterprise system 200, such as when certain resources are accessed, or when the user 110 first logs into the corresponding account. In some circumstances, such queries may be related to the topic or content accessed by the user 110, such as posing a query regarding the impressions of the user 110 regarding certain financial instruments when the user 110 has accessed educational materials regarding such financial instruments while navigating the interface of the web or software application 132. Such queries may form a portion of a survey provided by the enterprise system 200 for completion by the user 110, which may include a series of queries of related or unrelated content. The use of a survey may include a prompt for completion of the survey to be automatically and proactively displayed to the user 110, such as via an interface of one of the user devices 104, 106 during navigation of the web or software application 132, in order to increase participation in said survey.

The method includes a step 1002 of collecting training data including the personal data set with respect to each of the users 110 as required for performing the training of the machine learning program as described hereinabove, or alternatively as required for inputting data into the predictive model for providing, via the predictive model, at least one targeted action to be conducted by the agent 210. As described hereinabove, such personal data set may originate from any of the described sources 110, 200, 202, 204 and may be communicated to the computing system 206 of the enterprise system 200 using any of the methods or communication channels described hereinabove. Certain proprietary data is also collected directly by the enterprise system 200 as a result of the monitoring of the interactions of the enterprise system 200 and the user 110 as described hereinabove.

A step 1003 includes training the machine learning program utilizing the applicable training data to generate a predictive model having the capabilities described herein. The predictive model may be acquired utilizing any of the machine learning processes described herein without necessarily departing from the scope of the present invention.

A step 1004 includes providing at least one targeted action using the predictive model of the machine learning program as based on the personal data set of at least one user 110 at the time of the at least one targeted action is provided. This step 1004 may include the machine learning program correlating the personal data set of the individual user 110 to the propensity for the user 110 to undergo a change in the personal data set thereof as caused by a change in at least one data entry thereof, such as the changing of a data entry corresponding to the change in purchase status or the change in use of a specific product and/or service tendered by the enterprise system 200, or a change indicating that a specific query has been responded to in a specific manner. This step 1004 results in the formation of output data which may be stored to the storage device 224 of the computing system 206 as a form of the data 234. The output data generated by the predictive modeling of the machine learning program is referred to hereinafter as the target data of the machine learning program, and may relate to the at least one targeted action based upon the personal data set of the at least one user 110.

A step 1005 includes the computing system 206 of the enterprise system 200 optionally performing a task in reaction to the generation of the targeted actions. Such tasks may relate to a communication being sent to the agent device 212 for the agent 210 or a change in the behavior of the computing system 206 to reflect the contents of the target data and/or the targeted actions. These tasks are elaborated on in greater detail hereinafter.

A variety of different triggering conditions may be utilized by the computing system 206 in determining when the machine learning program should provide the targeted actions to the agent 210. In some embodiments, the targeted actions are determined and provided to the agent 210 of the enterprise system 200 when requested by the agent 210 such as for the purpose of evaluating past, current, and/or future campaigns with or without respect to a specific user 110. In some embodiments, the targeted actions are determined based upon results from at least one of a past, current, and future campaign. In other embodiments, the targeted actions are based upon past and/or current campaigns that meet at least one parameter set by the agent 210, such as past campaigns that involved specific users 110, current campaigns that involved users 110 with specific demographic and/or transaction histories, and the like, for example. In certain other embodiments, the targeted actions determine parameters for future campaigns. In yet another embodiment, the targeted actions are based upon at least one campaign conducted during a period of time determined by the agent 210. Such a request may be made of any number of the users 110, and may correspond to the preparation of campaigns corresponding to a product and/or service tendered by the enterprise system 200 or campaigns tailored to the specific user 110 or any number of users 110.

In other embodiments, the targeted actions may be determined and provided to the agent 210 at fixed intervals, or otherwise on a fixed schedule. For example, the targeted actions with respect to specific users 110 and/or specific campaigns at regular intervals, such as daily, weekly, monthly, or quarterly, or may be preprogrammed to occur on specific dates as requested by the agent 210, as non-limiting examples.

In other embodiments, the targeted actions may be determined and provided to the agent 210 when the personal data set of the specific user 110, as available for use in training the machine learning program and/or executing any predictive capabilities thereof, indicates that a triggering condition has occurred that may be indicative of the need for targeted actions by the agent 210, such as the occurrence of an event shown to have a strong correlation to a change in an assessment of the user 110 regarding the predictions relating to the user 110. As non-limiting examples, the personal data entries of the user 110 reflecting that the user 110 has reached a certain age, had a change in marital status, reached a certain account balance or status, or had a change in home ownership status may prompt the determination of the targeted actions when such a change is demonstrated to correlate to a change in the predictive assessment of the user 110, such as a change in the propensity for the user 110 to purchase or use a specific product and/or service. As another example, the triggering condition may relate to a data entry corresponding to the recent purchase or agreement to use a specific first product and/or service as tendered by the enterprise system 200, wherein it is known that the eventual purchase of a second product and/or service as tendered by the enterprise system 200 is correlated to the purchase of the first product. As yet another example, the triggering condition may relate to the initial entry of the response data set with respect to a specific user 110 upon that user 110 responding to a corresponding query. For example, if a query directly requests a response indicating whether the user 110 has interest in purchasing a product and/or service, a response indicating such interest may trigger a targeted action regarding a purchase of a corresponding product and/or service being provided to the agent 210.

Personal data specific to and accessible exclusively by the enterprise system 200 may be utilized in determining such a triggering condition. Such personal data may be acquired as a result of a campaign and/or the relationship present between the enterprise system 200 and the user 110. For example, if the enterprise system 200 is a financial institution having access to account records, the triggering condition may relate to a certain balance being reached within one of the accounts of the user 110, or to a failure of the user 110 to make a scheduled payment on a debt managed by the enterprise system 200, or the like. Such personal data may accordingly refer specifically to interactions between the user 110 and the enterprise system 200 as a part of the campaign and/or the relationship present between the user 110 and the enterprise system 200, including data regarding past transactions of the user 110 as initiated by the enterprise system 200 or transactions occurring directly between the user 110 and the enterprise system 200. For example, the enterprise system 200 may utilize data regarding purchases of the user 110 made with entities other than the enterprise system 200 (where such data is available, such as where a financial instrument such as a credit card or debit card associated with the enterprise system 200 is used in making these purchases) or data regarding transactions including payments, agreements, or other contractual obligations made directly between the user 110 and the enterprise system 200 with regards to a product and/or service tendered by the enterprise system 200.

Such personal data may also include data collected by the enterprise system 200 from a third party source where the user 110 has provided express consent for such data to be shared with or otherwise accessible to the enterprise system 200, such as data regarding transactions occurring between the user 110 and entities external to the enterprise system 200 that are not otherwise monitored directly by the enterprise system 200. For example, the enterprise system 200 may have access to data regarding transactions occurring with respect to a credit card or debit card of the user 110 associated with and/or managed by a financial institution other than the enterprise system 200, hence such data must be communicated to the enterprise system 200 for access thereto in determining such triggering events.

The enterprise system 200 may also utilize personal data collected with respect to the user 110 regarding the interactions of the user 110 with the enterprise system 200 via the corresponding web browser application or software application 132 associated with the enterprise system 200. For example, the navigating of the application 132 may include the user 110 reviewing information relating to certain products and/or services tendered by the enterprise system 200, or making a selection that additional information is requested with respect to a topic related to one of the queries of the survey corresponding to the target data. Similar data may be collected regarding campaigns and/or alternative interactions, such as whether or not the specific user 110 views or responds to email messages, text messages, or the like, as applicable. The determination of the target data based on such interactions may aid in proactively assessing the user 110 and providing the targeted actions to the agent 210, such as prompting the agent 210 to tender certain products and/or services when it has been determined that such products and/or services have been reviewed by the user 110 in conjunction with the data profile of the user 110, thereby indicating a need of the user 110 to attain such a product and/or service.

The triggering conditions indicated above may also be complex in nature and may include reference to multiple different variables of the personal data of the user 110 or multiple conditional relationships therebetween. As one example, upon determining that the age of the user 110 has surpassed a certain threshold, an additional variable of the personal data of the user 110, such as the balance of a savings account of the user 110 accessible to the enterprise system 200, may be utilized in determining whether the targeted actions must be determined and provided to the agent 210. Specifically, with respect to the given example, the triggering of the determination that the targeted actions be provided to the agent 210 may include the determination being made only if the age of the user 110 meets or exceeds the established threshold and the data regarding the account balance also meets or exceeds the established threshold. It should also be appreciated that the targeted actions may be provided to the agent 210 based on any combination of any of the above described conditions or events, as desired.

In some embodiments, the computing system 206 of the enterprise system 200 may continuously determine and provide the targeted actions to the agent 210 whenever additional personal data is acquired by the computing system 206 regarding the user 110 that has been utilized in training the machine learning program, whether derived from an interaction between the user 110 and the enterprise system 200 or acquired by the enterprise system 200 from a third party source 202, 204. This allows the targeted actions to be made by the agent 210 with respect to any one user 110 to always be as up to date as possible, thereby providing a semi-real time assessment of the user 110 via the targeted actions.

With renewed reference to step 1004 of FIG. 7, the enterprise system 200 may utilize the targeted actions for performing a variety of different tasks once such targeted actions have been determined and provided. In some circumstances, the targeted actions are utilized by the agents 210 of the enterprise system 200 to make determinations regarding further interactions with the user 110 or changes in behavior of the enterprise system 200. Such targeted actions may include whether to intervene by tendering certain products and/or services to the user 110 based on the likelihood of the user 110 to engage with the products and/or services.

The computing system 206 may determine to perform a specific task at step 1005 depending on a variety of different factors, including the use of several triggering conditions in similar fashion to the description of when a determination of when the targeted actions are provided to the agent 210 as described hereinabove with respect to step 1004. As mentioned before, each targeted action may be associated with a probability within the target data, and such probabilities of certain events occurring may represent the triggering condition for the computing system 206 to take further action with respect to a certain product and/or service. For example, each different product and/or service associated with the predictive model may have a unique threshold value that must be met or exceeded for the computing system 206 to take action as described hereinafter. If multiple products are being evaluated by the predictive model, only those products indicated by the predictive model as having a certain likelihood of engagement (such as purchase thereof) may be associated with a communication from the computing system 206 including the targeted actions. The computing system 206 may also be configured to only send communications to the agent 210 including the targeted actions with respect to those products and/or services ranked as being the most likely to be positively engaged with by the user 110, so as to avoid overwhelming the user 110 with excessive tenders or promotions.

The communication to the agent 210 from the enterprise system 200, including the targeted actions, may occur using any known communication method. For example, an email, text message, push notification, or the like may be generated by the computing system 206 for communication to the agent 210. Such a communication may be communicated from the computing system 206 to the agent device 212 of the agent 210 using any of the methods described hereinabove in describing the communication capabilities of the device 212 and systems 200, 206 within FIG. 1. The agent 210 may then review such a communication via interaction with the corresponding agent device 212, which provides a perceptible expression of the content of the communication. Such a perceptible expression of the content of the communication may include the targeted actions being visually perceptible, such as in the form of readable text able to be displayed on the agent device 212, or audibly perceptible, such as in the form of an audio file able to be played by the agent device 212. The display and/or speaker of the agent device 212 may be utilized in perceiving the content of the communication including the targeted actions.

One potential targeted action may include the agent 210 of the enterprise system 200 tendering products and/or services to the user 110 in reaction to an analysis of the target data specific to the user 110. The described tender of products and/or services from the agent 210 of the enterprise system 200 may take many different forms. In some circumstances, the tender may constitute a tender of educational materials or advertising materials regarding a specific product and/or service for which the user 110 is determined to have a propensity to purchase or use, as revealed by the target data associated with a corresponding user 110. Such an interaction may, in the case of educational materials, include a communication from the agent 210 of the enterprise system 200 to the user device 104, 106 of the user 110, such as by an email, text message, or push notification, as non-limiting examples. Such educational materials may additionally or alternatively be made available by the agent 210 for access via the account of the corresponding user 110 when accessing the web browser application or software application 132 corresponding to the enterprise system 200.

In other circumstances, the targeted action may be the agent 210 sending a communication to the user device 104, 106 including a direct tender for the product and/or service to be purchased by the user 110 or otherwise provided by the enterprise system 200 to the user 110 by express agreement. For example, the communication from the agent 210 to the user 110 may include a tender to purchase an investment related product and/or service from the enterprise system 200, or may include a tender for the enterprise system 200 to tender periodic advise to the user 110 regarding topics such as long-term planning as provided by an agent 210. Such communication from agent 210 to the user device 104, 106 may include information for redirecting the user device 104, 106, such as may occur via use of the appropriate web browser application or software application 132, to an appropriate interface for completing the purchase of the product and/or service, as may be accessible via the application 132.

In some circumstances, the communication from the agent 210 to the user 110 may also include a reference to the personal data of the corresponding user 110 for prepopulating data related to the purchase of the product and/or service. For example, if the process of completing the purchase of the product and/or service includes the user 110 entering information into an interface provided by the webpage or application 132, the personal data of the user 110 as known by the computing system 206 may be utilized to automatically prepopulate any fields of the purchase process to which the personal data corresponds. As another example, the purchase of some products and/or services may require documents to be populated with such personal data, hence the enterprise system 200 may be configured to automatically prepopulate such documents prior to communicating such documents to the user 110. Such documents may comprise transferable files of any desired type compatible with each of the associated devices or computing systems 104, 106, 206.

The agent 210 may, according to the targeted actions determined and provided by the machine learning algorithm, utilize the computing system 206 to provide an output in the form of a communication or message relating to a product and/or service that may be likely to be of interest to the user 110 or a preference of the user 110, wherein such communication or message may constitute a tender for purchase of the product and/or service. Such a communication or message may further include output in the form of a prepopulated document/file or a prepopulated payment interface relating to the corresponding purchase/agreement in an attempt to provide said product and/or services to the user 110. Such a prepopulated document or interface may be accessible via use of the user device 104, 106 following a transfer of the file/data to the user device 104, 106 from the computing system 206.

The agent 210 may, according to the targeted actions determined and provided by the machine learning algorithm, utilize the computing system 206 to alter the account settings of the user 110 to change a manner in which the agent 210 and/or the computing system 206 interacts with the user 110 via the corresponding user device 104, 106. For example, such account setting changes may include changing the settings relating to the frequency of communications sent from the agent 210 and/or the computing system 206 to the user 110 for access via the user device 104, 106, under what conditions to communicate with the user 110, the content of such communications, the types or forms of such communications (such as paperless communication), the manner in which the interface of the web browser application or software application 132 displays information to the user 110, or the information or resources accessible to the user 110 via navigation of the web browser application or software application 132, as non-limiting examples. The changing of the account settings may refer to the agent 210 and/or the computing system 206 altering the account related data stored as a form of the data 234 associated with the storage device 224, which in turn results in a reconfiguring of the operation of the agent device 212 and/or the computing system 206 with regards to how the agent device 212 and/or the computing system 206 subsequently interacts with the user device 104, 106 with respect to at least one variable.

As explained throughout, the predictive model generated by the machine learning program may be configured to provide at least one targeted action regarding substantially any data entry relating to the personal data set of the corresponding user 110, whether related to the query responses or the remaining personal data of the corresponding user 110. The predictive model may provide at least one targeted action about the traits or behaviors of the user 110 following (and potentially partially based upon) the response to a query or may provide at least one targeted action regarding a future response to a user 110 having not yet responded to a query. Examples of the execution of method 1000 with respect to various different applications of the predictive model are elaborated on hereinafter.

In some embodiments, the predictive model may be utilized to determine the propensity of a specific user 110 to engage with a specific product and/or service, such as making a purchase of the specific product and/or service. The specific user 110 may or may not be a user 110 that has responded to one or more queries to provide additional personal data with which to correlate the user 110 to other users 110 having also responded to the query via use of the predictive model. The prediction regarding the probability or propensity for an engagement such as a purchase to happen may occur following the occurrence of any of the triggering conditions listed herein, such as the responding of the user 110 to a query related to the product and/or service in question. The prediction may result in a further determination by the computing system 206 on whether to take further action, such as comparing the determined probability of the action in question to a threshold value. One possible further action includes providing at least one targeted action regarding the product and/or service to the agent device 212 when such a threshold is met or exceeded.

The predictive model may be configured to make a prediction regarding the preference of the user 110 regarding various different account settings or the like associated with the manner in which the user 110 interacts with the computing system 206 or the enterprise system 200. For example, the personal data profile of the user 110 may indicate that the user 110 is likely to adopt or prefer a specific account setting relating to the number, type, or form of communications occurring between the computing system 206 and the user device 104, 106. In reaction to this prediction, the predictive model may provide at least one targeted action to the agent 210 directed to requesting confirmation from the user 110 of such a change to the account setting, or the computing system 206 may automatically make the adjustment to the account setting in the absence of user 110 approval, where applicable.

In other embodiments, the predictive model is utilized to predict the response of the user 110 to a query where the predicted response is itself utilized in making a further determination regarding the activities of the computing system 206. For example, as mentioned above, some queries may directly relate to the interest of the user 110 with respect to one or more specific products and/or services, or may directly request a ranking or preference among such products and/or services. In such instances, the selection of the user 110 of a certain product and/or service in responding to a query may itself be a triggering event for causing further action to be taken in accordance with step 1004 of method 1000. In such a circumstance, the predictive model may be utilized to predict the response of the user 110 to such a triggering query, wherein such a prediction of the response may be substituted for the actual response of the user 110 in making an assessment of the further action to be taken by the computing system 206. As such, the use of the predictive model in predicting a specific response allows for the ability to target users 110 believed to have interest in a specific product and/or service absent these users 110 having actually responded to the query in question, or having participated in an accompanying campaign. Specifically, the target data relating to the probability of a certain event occurring, such as a purchase of a specific product and/or service, may be utilized for comparison to a threshold value for determining if at least one targeted action is required to address this prediction.

As another related example, the query response being predicted may relate to a preference of the user 110 regarding certain future interactions between the user 110 and the computing system 206 and/or enterprise system 200, such as would be associated with a specific account setting of the user 110. For example, the query may ask what method of communication as utilized by the computing system 206 and/or the enterprise system 200 is preferred by the user 110 under a certain circumstance. The ability to predict this response allows for the model to provide at least one targeted action for the agent 210 to proactively request or automatically make such a change to the account settings of the user 110 regardless of the user 110 having specifically engaged in the campaign and corresponding query in question.

The use of the machine learning program and resulting predictive model improves the efficiency of the agent 210 and operation of the computing system 206 in various different respects. First, the disclosed method provides an ability for the agent 210 to eliminate unnecessary calculations and communications relating to certain tasks performed by the agent 210 and/or the computing system 206 that have been found to not have a positive impact on securing the desired product and/or service from the user 110. This may be especially relevant where such campaign materials are to be produced in hard copy form and mailed to the user 110, as extensive costs can be avoided by targeting the correct users 110. This results in the agent 210 and the computing system 206 avoiding a waste of resources when performing certain tasks, such as sending unnecessary communications of various forms to users 110 that will never interact with or benefit from the sending of such communications. Second, the use of the machine learning program also allows for certain variables in the personal data sets utilized in the training process to be determined to be irrelevant to certain relationships. The identification of these variables that do not predict any specific result may be omitted from further analysis or may no longer be monitored by the computing system 206 in forming the personal data sets. The predictive model accordingly provides a means to identify those data that are not necessary to be tracked or collected and further allows for the calculations occurring via the computing system 206 to be simplified by means of the elimination of additional variables. Third, the machine learning program provides the agent 210 greater insight to determine other related actions to take that may increase the probability of the completion of a sale or the like with respect to a specific product and/or service, or in improving the preference of the user 110 with respect to a desired account setting. Each of the described advantages leads to a reduction in network traffic as experienced by the computing system 206 due to the ability to target only those communications predicted to have a preselected probability of having a positive impact on the engagement with the corresponding users.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

From the foregoing description, one ordinarily skilled in the art can easily ascertain the essential characteristics of this invention and, without departing from the spirit and scope thereof, can make various changes and modifications to the invention to adapt it to various usages and conditions.

I claim:

1. A system for improving distributed network data flow efficiency using machine learning, the system comprising:
   an agent device configured to wirelessly communicate with at least one user device, wherein the agent device is configured to execute a software application;
   a computer with one or more processor and memory, wherein the computer executes computer-readable instructions to guide interactions between the agent device and the at least one user device; and
   a network connection operatively connecting the agent device, the at least one user device, and the computer, the network connection configured to permit network data flow between the agent device, the at least one user device, and the computer;
   wherein, upon execution of the computer-readable instructions, the computer is configured to:
      train a machine learning program to predict a targeted action that can be communicated through digital communication and has an increased likelihood of user engagement, the training including:
         iteratively simulating a prediction of a target variable value using training test data;
         comparing and testing the prediction to the target variable value; and
         iteratively updating weights in calculations used to improve predictability of the target variable value during each subsequent iteration;
      deploy the trained machine learning program as a predictive model;
      initiate providing, via a user interface of a user device of the at least one user device, a user software application to a user for installation on the user device, wherein the user device is configured to wirelessly communicate with the computer via the user software application;
      receive, via the user software application installed on the user device, personal data of the user, wherein the personal data includes financial transactions by the user and facilitated by the system;

generate a personal data set based upon the personal data of the user, the personal data set comprising data relating to responses to queries, where the queries are posed to the user by the computer and linked to a particular topic, where the particular topic is included as part of an organized campaign;

apply the personal data set of the user to the predictive model to identify a predicted targeted action likely to engage the user, wherein identification of the predicted targeted action incorporates a change in value of a specific data entry of the personal data set due to a specific response to a query of the responses to queries;

identify, based on applying the personal data set to the predictive model, a user-specific targeted action predicted to have an increased probability of positive engagement with the user such that digital communications transmitted to the user device are more user-specific;

transmit, via the network connection, a communication including the user-specific targeted action to the agent device, wherein at least one triggering condition causes the communication including the user-specific targeted action to be provided to the agent device;

initiate displaying the communication including the user-specific targeted action on the agent device;

transmit the communication comprising the user-specific targeted action to the user device; and initiate displaying, via the user software application, the user-specific targeted action on a graphical user interface of the user device.

2. The system of claim 1, wherein the computer performs steps further comprising: requesting a response from the user in response to the queries; and storing the response of the user as response data, the response data forming a subset of the personal data set of the user.

3. The system of claim 2, wherein the queries are distributed and the response is requested when the user is enrolling or participating in the organized campaign.

4. The system of claim 1, wherein the communication is a perceptible expression including the user-specific targeted action related to the user.

5. The system of claim 1, wherein the user-specific targeted action is related to purchasing a first product and/or service.

6. The system of claim 1, wherein the user-specific targeted action is related to at least one of a past, current, and future organized campaign.

7. The system of claim 1, wherein the organized campaign is a past organized campaign, wherein the user-specific targeted action is determined based upon the past organized campaign and a current organized campaign that meets at least one parameter set by an agent associated with the agent device.

8. The system of claim 1, wherein, upon execution of the computer-readable instructions, the computer is further configured to receive, from the user device, a response to the user-specific target action, wherein the response to the user-specific targeted action provides at least one parameter to be included in the personal data set for at least one future organized campaign.

9. The system of claim 1, wherein the organized campaign is conducted during a period of time determined by an agent associated with the agent device.

10. The system of claim 1, wherein the training of the machine learning program includes unsupervised learning wherein entries of the training test data—are unlabeled.

11. The system of claim 1, wherein the machine learning program is configured to perform cluster analysis with respect to the training test data during the training of the machine learning program.

12. The system of claim 1, wherein the computer is configured to perform at least one of correlation analysis and regression analysis with respect to the personal data set.

13. The system of claim 1, wherein the machine learning program comprises at least one neural network that generates a self-organizing map.

14. The system of claim 1, wherein the training of the machine learning program includes semi-supervised learning, wherein during the semi-supervised learning the training test data further includes data relating to whether the user interacted with a first product and/or service in response to a probability prediction.

15. The system of claim 1, wherein the training of the machine learning program includes supervised learning with entries of the training test data being labeled.

16. The system of claim 1, wherein the personal data set of the user includes demographic data.

17. The system of claim 1, wherein the personal data set of the user includes a transaction history of the user.

18. The system of claim 1, wherein the at least one triggering condition is utilized by the computer in determining when to provide the communication including the user-specific targeted action to the agent device.

19. A method of improving distributed network data flow efficiency using machine learning, comprising the steps of:

training a machine learning program to predict a targeted action that can be communicated through digital communication having an increased likelihood of user engagement, the training including:
iteratively simulating a prediction of a target variable value using training test data;
comparing and testing the prediction to the target variable value; and
iteratively updating weights in calculations used to improve predictability of the target variable value during each subsequent iteration;

deploying the trained machine learning program as a predictive model;

providing, via a computer system, one or more control signals facilitating access, via a user interface of a user device, to a user software application for installation on the user device;

receiving, via the user software application installed on the user device, personal data of a user, wherein the personal data includes financial transactions by the user and facilitated by the computer system;

generating, via the computer system, a personal data set based upon the personal data of the user, the personal data set comprising data relating to responses to queries, where the queries are posed to the user and linked to a particular topic, where the particular topic is included as part of an organized campaign;

applying the personal data set of the user to the predictive model to identify a predicted targeted action likely to engage the user, wherein identification of the predicted targeted action incorporates a change in value of a specific data entry of the personal data set due to a specific response to a query of the responses to queries;

identifying, based on applying the personal data set to the predictive model, a user-specific targeted action predicted to have an increased probability of positive engagement with the user such that digital communications transmitted to the user device are more user specific;

transmitting, via a network connection, a communication including the user-specific targeted action to at least one agent device, wherein at least one triggering condition causes the communication that includes the user-specific targeted action to be provided to the at least one agent device;

initiating displaying the communication including the user-specific targeted action on the at least one agent device;

transmitting the user-specific targeted action to the user device; and displaying, via the user software application, the user-specific targeted action on the user interface of the user device.

20. A method of improving distributed network data flow efficiency using machine learning, comprising the steps of:

providing at least one agent device configured to wirelessly communicate with at least one user device, wherein the at least one agent device is configured to execute a software application;

providing a computer system with at least one processor and at least one memory device, wherein the computer system executes computer-readable instructions;

providing a network connection operatively connecting the at least one agent device, at least one user device, and the computer system, the network connection configured to permit network data flow between the at least one agent device, the at least one user device, and the computer system;

training a machine learning program to predict a targeted action that can be communicated through digital communication having an increased likelihood of user engagement, the training including:

iteratively simulating a prediction of a target variable value using training test data;

comparing and testing the prediction to the target variable value;

iteratively updating weights in calculations used to improve predictability of the target variable value during each subsequent iteration;

deploying the trained machine learning program as a predictive model;

providing, via the computer system, a user software application to at least one user for installation on at least one user device;

receiving, via the user software application installed on the at least one user device, personal data of a user, wherein the personal data includes financial transactions between the user and the computer system;

generating, via the computer system, a personal data set based upon the personal data of the user, the personal data set comprising data relating to responses to queries, where the queries are posed to the user and linked to a particular topic, where the particular topic is included as part of an organized campaign;

applying the personal data set of the user to the predictive model to identify a predicted targeted action likely to engage the user, wherein identification of the predicted targeted action incorporates a change in value of a specific data entry of the personal data set due to a specific response to a query of the responses to queries;

identifying, based on applying the personal data set to the predictive model, a user-specific targeted action predicted to have a preselected probability of positive engagement with the user such that digital communications are more user specific;

transmitting, via the network connection, a communication including the user-specific targeted action to the at least one agent device, wherein at least one triggering condition causes the communication including the user-specific targeted action to be provided to the at least one agent device;

initiating displaying the communication including the user-specific targeted action on the at least one agent device;

transmitting a wireless communication related to an organized campaign to a target user device based upon the user-specific targeted action, wherein the wireless communication is provided to a target user via the user software application; and displaying, via the user software application, information of the wireless communication on a graphical user interface of the target user device.

* * * * *